United States Patent [19]
Hass

[11] Patent Number: 4,892,717
[45] Date of Patent: Jan. 9, 1990

[54] GAS TREATING PROCESS

[75] Inventor: Robert H. Hass, Fullerton, Calif.

[73] Assignee: Union Oil Company of California, Los Angeles, Calif.

[21] Appl. No.: 761,065

[22] Filed: Jul. 31, 1985

[51] Int. Cl.$^4$ .................. C01B 33/00; C01B 17/16; C01B 3/12; C01B 3/16

[52] U.S. Cl. .................. 423/217; 423/563; 423/564; 423/655; 423/656

[58] Field of Search .............. 423/219, 655, 563, 564, 423/656

[56] References Cited

U.S. PATENT DOCUMENTS

| | | | |
|---|---|---|---|
| 3,752,877 | 8/1973 | Beavon | 423/244 A |
| 3,957,962 | 5/1976 | Ramsbotham | 423/655 |
| 4,041,130 | 8/1977 | Mackles | 423/564 |
| 4,060,589 | 11/1977 | Hass et al. | 423/224 |
| 4,181,503 | 1/1980 | Lesieur et al. | 423/650 |
| 4,192,857 | 3/1980 | Tellier et al. | 423/219 |
| 4,243,647 | 1/1981 | Hass et al. | 423/573 G |
| 4,283,379 | 8/1981 | Fenton et al. | 423/571 |
| 4,325,936 | 4/1982 | Gowdy et al. | 423/573 R |
| 4,505,880 | 3/1985 | Deschamps et al. | 423/219 |
| 4,528,277 | 7/1985 | Hass et al. | 502/79 |

FOREIGN PATENT DOCUMENTS 1332337 11/1973 United Kingdom.

OTHER PUBLICATIONS

Mellor, A Comprehensive Treatise on Inorganic and Theoretical Chemistry, 1949, p. 217, vol. X.
United Catalysts Inc. Product Bulletin C25-0281, Sour Gas Shift Catalyst.
"The Sulften TM System—Advanced Tail Gas Treating", by Kroop et al., Union Carbide Corporation and Ford, Bacon & Davis.
"The Sulften TM System: Commercial Experience with a New Tail Gas Treating Technology", by Tragitt et al., presented at the 1985 NPRA Annual Meeting, Mar. 24–26, 1985, San Antonio Convention Center, San Antonio, Tex.
"Claus Tail Gas Treating with the Sulften TM System", by Taggart et al., set forth in *Proceedings of Sulfur-84*, presented in Calgary Canada, Jun. 3–6, 1984.

*Primary Examiner*—John Doll
*Assistant Examiner*—Lori S. Freeman
*Attorney, Agent, or Firm*—Gregory F. Wirzbicki

[57] ABSTRACT

Catalysts susceptible to deactivation by free oxygen or to reactions involving free oxygen are protected by scavenging the oxygen in the presence of an oxidation catalyst, so as to remove commingled oxygen from the reactants to be converted in the presence of the catalyst suscepticle to oxygen attack.

77 Claims, 1 Drawing Sheet

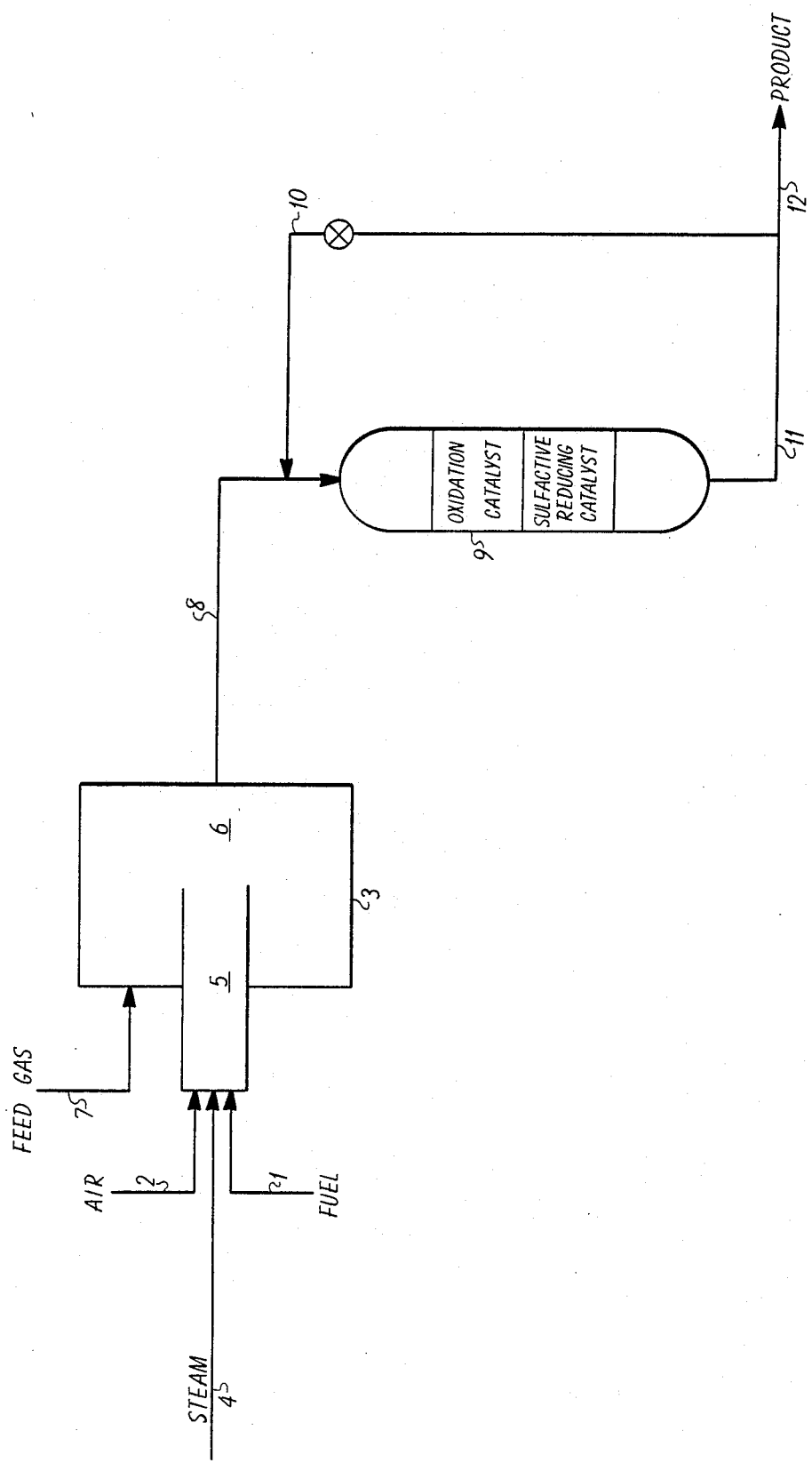

GAS TREATING PROCESS

BACKGROUND OF THE INVENTION

This invention relates to a method for preventing oxygen from deactivating sulfactive reducing catalysts, and particularly catalysts comprising cobalt and molybdenum components on a refractory oxide support.

Catalysts comprising cobalt and molybdenum sulfides as the active catalytic components on essentially inert supports, such as alumina or other porous refractory oxides, are well known to be active for promoting reducing reactions, for example, the reduction of sulfur dioxide to hydrogen sulfide by reaction with hydrogen. As taught in U.S. Pat. Nos. 3,752,877 and 4,243,647, both of which are herein incorporated by reference in their entireties, such cobalt-molybdenum catalysts are also highly useful, under net reducing conditions, for not only reducing sulfur dioxide to hydrogen sulfide by reaction with hydrogen, but also mercaptans and sulfur vapor. In addition, the same catalyst is also useful for hydrolyzing carbonyl sulfide and carbon disulfide to hydrogen sulfide at elevated temperatures, usually above about 650° F. Thus, for a Claus tail gas stream or the like, which contains an assortment of sulfur components such as $SO_2$, $CH_3SH$, $COS$, $CS_2$, and $S_x$ (vapor), cobalt-molybdenum and other Group VIII-Group VIB catalysts are highly useful for simultaneously converting in a single catalytic reactor vessel all of said components to $H_2S$. The $H_2S$ is then usually treated separately for conversion to elemental sulfur as a product, for example, by the Stretford process mentioned in U.S. Pat. No. 3,752,877 or the partial oxidation process using vanadia catalysts taught in U.S. Pat. No. 4,243,647 or by the methods described in U.S. Pat. Nos. 4,283,379 and 4,325,936.

One known difficulty with using sulfided cobalt-molybdenum catalysts and the like for the simultaneous hydrogenation/hydrolysis reactions described above is that, if oxygen is present in the feed gas entering the catalytic chamber, the catalyst will gradually and irreversibly deactivate for the intended conversions to hydrogen sulfide and particularly for the reduction of $SO_2$ to $H_2S$. See, for example, U.S. Pat. No. 4,060,589 at column 5, lines 6 to 13, and U.S. Pat. No. 4,243,647 at column 5, lines 65 to 68.

Thus, in the process described in the aforementioned U.S. Pat. No. 3,752,877, the reducing gas generator yielding the necessary reducing agents for the hydrogenation reactions by the partial combustion of a fuel gas is normally operated under sub-stoichiometric conditions. That is, the amount of oxygen (or air) fed to the generator is less than that required for full combustion of the fuel to $CO_2$ and water vapor, with the intended result being that all the oxygen is consumed. However, in actual practice, even under sub-stoichiometric conditions, incomplete consumption of oxygen can occur, perhaps due to poor burner design or inefficient operation of the burner in the reducing gas generator. Additionally, even when these problems are overcome, upsets in burner operation can also result in oxygen being present from time to time with the desired reducing agents.

Therefore, it is a primary object of this invention to provide a method for preventing oxygen from deactivating or otherwise "poisoning" a hydrolysis and/or hydrogenation catalyst susceptible to oxygen deactivation.

It is an especial object of the invention to provide such a method for protecting sulfided cobalt-molybdenum catalysts employed to simultaneously convert assorted sulfur components to hydrogen sulfide.

Another object of the invention is to provide a process for essentially completely hydrolyzing carbonyl sulfide to hydrogen sulfide at temperatures less than about 600° F.

And yet another object of the invention is to provide a fuel-saving process for hydrogenating any sulfur component selected from the group consisting of sulfur dioxide, gaseous mercaptans and sulfur vapor and hydrolyzing carbonyl sulfide at temperatures less than 600° F., with the fuel savings increasing when oxygen is present in the feed.

These and other objects of the invention will become more apparent in view of the following specification and claims.

SUMMARY OF THE INVENTION

In the method of the present invention, catalysts susceptible to oxygen poisoning or deactivation are protected from the harmful effects of oxygen by first contacting the reactants to be catalyzed in the presence of commingled free oxygen with an oxidation catalyst to scavenge the oxygen by reaction with hydrogen sulfide. The products of the oxidation, either $SO_2$ or sulfur vapor or both, are then contacted along with all the reactants for the desired reaction or reactions with the catalyst susceptible to oxygen poisoning, assuming, of course, that said catalyst is not deactivatable by the produced $SO_2$ or sulfur vapor. Preferably, the catalyst susceptible to $O_2$ poisoning is active for converting the produced $SO_2$ or sulfur vapor to other components which are either innocuous or beneficial to downstream operations. In particular, it is preferred that the catalyst susceptible to oxygen poisoning be active for hydrogenating $SO_2$ and sulfur vapor to hydrogen sulfide and, even more preferably, to be further active for the hydrolysis of $COS$ and $CS_2$ to hydrogen sulfide and the hydrogenation of gaseous mercaptans to hydrogen sulfide.

If a catalyst downstream of the oxidation catalyst is sulfactive (i.e., active in the presence of $H_2S$) but deactivates in the presence of either $SO_2$ or elemental sulfur vapor, then an alternative embodiment of the invention provides for first scavenging oxygen, if present, by reaction with hydrogen sulfide in the presence of the oxidation catalyst, followed by hydrogenation of the produced sulfur and/or $SO_2$ to $H_2S$ in the presence of a sulfactive reducing catalyst, followed in turn by the catalysis of a desired reaction or reactions in the presence of the sulfactive catalyst susceptible to poisoning by either $SO_2$ or sulfur vapor.

One surprising discovery in the present invention is that low temperature sour gas shift catalysts, meaning catalysts having high activity for promoting the water gas shift reaction of $CO$ with $H_2O$ to form $H_2$ and $CO_2$ in the presence of $H_2S$ at temperatures below 600° F., are also highly active for the catalysis of $COS$ to $H_2S$ by hydrolysis at temperatures below 600° F. If the particular low temperature sour gas shift catalyst chosen is deactivatable by free oxygen but not $SO_2$ and/or sulfur vapor, then it may be employed downstream of the oxidation catalyst without treatment for $SO_2$ and/or sulfur vapor removal. If, however, it is deactivatable by $SO_2$ and/or sulfur vapor as well as oxygen, then treatment is needed for $SO_2$ and/or sulfur vapor removal, preferably by use of a catalyst active for hydrogenating the $SO_2$ and/or sulfur vapor to hydrogen sulfide upstream of said low temperature sour gas shift conversion catalyst.

BRIEF DESCRIPTION OF THE DRAWING

The drawing depicts in flow-sheet format the preferred embodiment of the invention when free oxygen is commingled with the reactants to be contacted with a sulfactive hydrogenation/hydrolysis catalyst susceptible to oxygen poisoning.

DETAILED DESCRIPTION OF THE INVENTION

The present invention is primarily and preferably directed to protecting sulfactive reducing catalysts used to convert $SO_2$ to $H_2S$ by reaction with hydrogen from the deactivating effects of oxygen. A preferred method for accomplishing this object is shown in the drawing, wherein reference numeral 3 indicates a reducing gas generator. In the reducing gas generator, a fuel (e.g., $C_1$ to $C_3$ hydrocarbons) from line 1 is combusted with a sub-stoichiometric amount of air from line 2 in combustion zone 5. Also introduced into the combustion zone is steam, to prevent coking, via conduit 4. The products of combustion include carbon dioxide, carbon monoxide, hydrogen, water vapor and inert components associated with air, e.g., argon and nitrogen; these products are collected in plenum chamber portion 6 of the reducing gas generator and blended with the feed gas to be treated for $SO_2$ removal in line 7. The amount of fuel burned in the reducing gas generator is adjusted to the rate of the $SO_2$-containing gas, so that the resulting blend will be at a desired temperature, usually from 260° to 1200° F., and contain sufficient hydrogen and/or carbon monoxide for the reduction of $SO_2$ to $H_2S$. The blend of $SO_2$-containing gas and products of combustion is then carried in line 8 to adiabatic catalytic reactor vessel 9, and, if the $SO_2$-containing gas stream in line 7 does not also contain $H_2S$, then $H_2S$ is blended into line 8 from recycle line 10.

Catalytic reactor vessel 9 contains an upper bed of oxidation catalyst and a lower bed of sulfactive reducing catalyst. Contaminant oxygen, which may have been among the products of combustion from reducing gas generator 3, is removed by reaction with hydrogen sulfide in the presence of the oxidation catalyst, producing either $SO_2$ by:

$$2H_2S + 3O_2 \rightarrow 2SO_2 + 2H_2O \qquad (I)$$

or sulfur by the two-step reaction:

$$2H_2S + 3O_2 \rightarrow 2SO_2 + 2H_2O \qquad (II)$$

$$2H_2S + SO_2 \rightleftharpoons 3S + 2H_2O \qquad (III)$$

The resulting gases, now essentially free of oxygen, pass through the bed of reducing catalyst, which promotes the hydrogenation of $SO_2$ to hydrogen sulfide by the following reaction:

$$3H_2 + SO_2 \rightarrow H_2S + 2H_2O \qquad (IV)$$

The hydrogen for the above reactions is, of course, a reactant produced in the reducing gas generator, but assuming that the reducing catalyst is active for the water gas shift reaction in the presence of hydrogen sulfide (i.e., the sour water gas shift reaction), then some hydrogen for reaction (IV) is produced in situ by the following reaction:

$$CO + H_2O \rightarrow CO_2 + H_2 \qquad (V)$$

The product gas recovered from vessel 9 by line 11 is essentially free of $SO_2$, containing $H_2S$ in its stead. This product gas, after a portion is recycled via line 10, if needed, is then sent by line 12 to sulfur recovery facilities, not shown. These facilities typically involve a heat exchanger to recover heat from the gases in line 12, followed by a contact condenser to remove water, which in turn is followed by the oxidation of the $H_2S$ to sulfur, for example, by the Stretford process described in U.S. Pat. No. 3,752,877, or the method, described in U.S. Pat. Nos. 4,283,379 and 4,325,936, both of which are herein incorporated by reference in their entireties, or the gas phase partial oxidation processes employing vanadia or vanadium-bismuth catalysts as described in U.S. Pat. Nos. 4,243,647 and 4,528,277, both herein incorporated by reference in their entireties.

Indeed, the preferred oxidation catalysts for use in vessel 9 are the vanadia and vanadium-bismuth catalysts disclosed in either or both of the foregoing two patents, with the vanadium-bismuth catalyst being most preferred due to its higher activity for promoting the oxidation of hydrogen sulfide. It is, however, within the scope of the present invention to employ as the oxidation catalyst essentially any solid phase catalyst having activity for oxidizing $H_2S$ to $SO_2$. Generally speaking, these catalysts comprise one or more active metal components, such as the oxides or sulfides of platinum, palladium, chromium, and the like on a porous refractory oxide support, such as alumina, silica-alumina, silica-zirconia, zirconia, silica, titania, silica-titania, etc. Such catalysts are typically in particulate form and may be prepared by methods well known in the art.

The reducing catalyst comprises any solid phase catalyst, preferably in particulate form, which is susceptible to deactivation by free oxygen but has catalytic activity for hydrogenating $SO_2$ to $H_2S$. Typically, the catalyst is sulfactive (i.e., does not deactivate in the presence of $H_2S$) and comprises a Group VIII or Group VIB metal sulfide, on a support comprising or consisting essentially of a porous refractory oxide, such as alumina, silica, zirconia, silica-alumina, silica-zirconia, and the like. The preferred catalyst contains both a Group VIB metal component and a Group VIII metal component (with the latter being even more preferably an iron group metal component) and has been sulfided, e.g., by contact with a flowing stream of 90 percent $H_2$ and 10 percent $H_2S$ at an elevated temperature. Typically, the Group VIB metal is present in the catalyst in a proportion between about 8 and 20 percent by weight, as calculated as the metal trioxide, while the Group VIII metal is present in a proportion between about 3 and 8 weight percent, as calculated as the metal monoxide. The preferred Group VIB metals are tungsten and molybdenum and the preferred Group VIII metals are nickel and cobalt. The most preferred catalyst comprises both cobalt and molybdenum components and may, for example, be a sulfided cobalt-molybdenum catalyst.

Many of the foregoing reducing catalysts, and particularly the preferred catalysts comprising both cobalt and molybdenum components, are well known to be active not only for hydrogenating $SO_2$ to $H_2S$ and promoting the water gas shift reaction but also for the following reactions:

$$S_x + H_2 \rightarrow xH_2S \tag{VI}$$

$$CH_3SH + H_2 \rightarrow CH_4 + H_2S \tag{VII}$$

$$CS_2 + 2H_2O \rightarrow CO_2 + 2H_2S \tag{VIII}$$

$$COS + H_2O \rightarrow CO_2 + H_2S \tag{IX}$$

Such catalysts, therefore, are particularly useful in treating Claus tail gas streams and the like which contain an assortment of gaseous sulfur components. These catalysts have simultaneous activity for hydrogenating the gaseous sulfur components of sulfur dioxide, elemental sulfur, and gaseous mercaptans to hydrogen sulfide and hydrolyzing carbon disulfide and carbonyl sulfide to hydrogen sulfide. Since hydrogen sulfide is the product of all the reactions, the sulfur components are converted to a single sulfur species, which can be readily converted to elemental sulfur by the Stretford process or the other methods described above.

The operating conditions in vessel 9 will vary significantly with the composition of the gas feed in line 7 and the catalytic activities of the oxidation and reducing catalysts employed in vessel 9. Typically, vessel 9 will be maintained under net reducing conditions throughout, with temperatures of 260° to 1200° F. usually prevailing and pressures typically being from near atmospheric to 300 p.s.i.g., and with the preferred pressure being just enough above atmospheric to force the gas stream through the vessel. The gas flow through the bed of oxidation catalyst is preferably at a space velocity between about 2,000 and 10,000 v/v/hr (as calculated at 60° F.) with the inlet temperature generally being above 260° F. and with operating temperatures usually ranging from 300° to 700° F. The gas flow through the bed of reducing catalyst is preferably between about 2,000 and 4,000 v/v/hr. Temperatures in the reducing catalyst bed typically range from 500° to 900° F., with the preferred operating temperature in the reducing bed varying according to the gas composition and reducing catalyst. With a typical sulfided hydrogenation catalyst containing only cobalt and molybdenum active metal components, temperatures as low as 300° F. and even lower may be useful for hydrogenating sulfur dioxide, sulfur vapor, and mercaptans as well as, perhaps, hydrolyzing carbon disulfide. Thus, if the feed in line 7 contains only $SO_2$, $S_x$, $CS_2$, and $CH_3SH$ (and other mercaptans), and if only hydrogen is present as the reducing agent (e.g., if a source of pure hydrogen were used instead of the reducing gas generator which produces CO as well as hydrogen), then one may employ low temperature operation and be assured of essentially full conversion to hydrogen sulfide of all the gaseous sulfur components in the feed. However, if COS is present in the feed, or if COS should form in the presence of the reducing catalyst, for example, by a reaction such as:

$$xCO + S_x \rightarrow xCOS \tag{X}$$

then the operating temperature in vessel 9 must be above about 600° F., usually above about 650° F., because a catalyst containing only cobalt and molybdenum as the active metal components has less than commercially desired activity for hydrolyzing COS to hydrogen sulfide at such low temperatures.

However, it is a discovery in the present invention that low temperature sour gas shift catalysts also have activity at low temperatures for hydrolyzing COS. One such catalyst is marketed by United Catalysts, Inc., under the designation C25-2-02. This catalyst contains about 2.7 to 3.7 weight percent of cobalt components, calculated as CoO, about 11.0 to 13.0 weight percent molybdenum components, calculated as $MoO_3$, about 0.9 to 1.3 weight percent rare earth metal components, calculated as $RE_2O_3$, and about 0.5 to 3.0 weight percent manganese components, calculated as MnO on an alumina support. This catalyst, which is susceptible to oxygen poisoning, has not only been discovered in the present invention to have high activity for hydrolyzing CO to $H_2$ and COS to $H_2S$ at low temperatures, i.e., below 600° F., but also to have a substantially reduced activity for these reactions in the presence of $SO_2$, i.e., the catalyst deactivates in the presence of $SO_2$ for hydrolysis reactions.

The benefits of the present discovery are most immediately taken advantage of by employing two catalysts in the bed of reducing catalyst in vessel 9. The first catalyst is a hydrogenation catalyst, such as the typical sulfided cobalt-molybdenum catalyst, which, at 600° F. or less, has high activity for hydrogenation reactions and moderate activity for the low temperature sour gas shift reaction and the hydrolysis of COS. The second catalyst is a hydrolysis catalyst (such as C25-2-02), which, at temperatures below 600° F., is highly active for the low temperature sour gas shift reaction and the hydrolysis of COS in the absence of $SO_2$. In this embodiment of the invention, it is preferred that the catalysts be employed as two discrete beds as opposed to a simple admixture thereof. The reason for this is that the C25-2-02 catalyst has been discovered in this invention to deactivate for hydrolyzing CO or COS in the presence of $SO_2$. Accordingly, to avoid deactivation problems, it is preferred that the typical cobalt-molybdenum catalyst be employed as a first (or upper) bed to hydrogenate the $SO_2$ followed by a second bed of the C25-2-02 or other low temperature sour shift gas catalyst to hydrolyze any COS which was present in the feed or which formed in vessel 9.

It will be seen that the use of two catalysts following the oxidation catalyst, one a true reducing catalyst and the other primarily a hydrolysis catalyst, provides the advantage of remarkable fuel savings, i.e., less fuel is required in reducing gas generator 3 in order to achieve desired results. The reason for this is that all desired hydrogenation and hydrolysis reactions can be promoted by at least one of the two catalysts at low temperatures. Moreover, the presence of the oxidation catalyst in vessel 9 also contributes to fuel savings, because the oxidation of $H_2S$ to either sulfur or $SO_2$ is an exothermic reaction. Thus, it is possible not only to employ the oxidation catalyst as an oxygen scavenger of contaminant oxygen, but one could also deliberately blend oxygen or air into the feed gas in line 7. Since the preferred vanadium-bismuth catalyst is active for oxidizing $H_2S$ at temperatures as low as about 250° to 350° F., and even lower, it can be seen that one need only employ that amount of fuel in line 1 which will provide enough reducing reactants as necessary for the intended hydrogenation/hydrolysis reactions and heat the feed gas in line 7 to a temperature which will assure light off of the scavenging reaction in the bed of oxidation catalyst.

Additional points relative to the process of the invention are:

(1) For optimum results, the feed of fuel and air to reducing gas generator 3 should be adjusted such that at least the stoichiometric amount of reducing agent is produced, which amount is calculated by the following molar equation:

$$[CO+H_2]=2[O_2]+3[SO_2]+[RSH]+[S]$$

where the bracketed formulae are in molar concentrations, RSH represents all gaseous mercaptans, and [S] is the number of moles of sulfur as sulfur vapor as calculated by dividing the total weight per unit volume of sulfur vapor by the atomic weight of sulfur.

(2) To effect maximum oxygen scavenging in the bed of oxidation catalyst, it is, of course, necessary that the $H_2S$ content of the feed be sufficient for this purpose. The stoichiometric amount of $H_2S$ required to be present, either inherently in the feed or by recycle via line 10 or a combination thereof is:

$$[H_2S]=2[SO_2]+2[O_2]$$

if the $H_2S$ is converted to sulfur and:

$$[H_2S]=2[SO_2]+1.5[O_2]$$

if the $H_2S$ is converted to sulfur dioxide. Since it is difficult to determine whether or not the scavenging reaction will produce $SO_2$ or sulfur or some combination thereof, it is preferred to operate with at least as much $H_2S$ in the feed entering vessel 9 as is determined by the first of the two foregoing equations.

(3) In the above discussion, the focus was mainly on feed gases in line 7 which contained $SO_2$, and this for the reason that most feeds to be treated will contain $SO_2$. However, there are some contemplated feeds, such as feeds from coal gasification, which would not contain $SO_2$ but which could still be advantageously treated in the invention. For example, some coal gasification feeds contain a large proportion of $CO_2$ and minor proportions of CO, $O_2$, $H_2S$, and COS; one contemplated feed, a gas stream from a Rectisol unit, has the following analysis: 95.82% $CO_2$, 0.98% $H_2S$, 0.0170% COS, 0.54% CO, 0.1% $O_2$, 0.10% $H_2$, 0.34% $N_2$, 0.0010% $NH_3$, 0.0140% HCN, and 2.088% light hydrocarbons. Such a feed could clearly be advantageously treated in the invention since the COS could be converted to $H_2S$ by hydrolysis (Reaction IX), and the CO to $H_2$ by the shift reaction (Reaction V), in the presence of a hydrolysis catalyst, while the need would also exist for the oxidation catalyst to scavenge the oxygen by promoting its reaction with the available $H_2S$. In this embodiment of the invention, one would preferably employ in vessel 9 any suitable oxidation catalyst (but most preferably a vanadium-bismuth catalyst) followed by the C25-2-02 catalyst or other low temperature sour gas shift catalyst to hydrolyze the COS to $H_2S$. If it is found that the oxygen in the feed is converted to $SO_2$ instead of sulfur vapor, then, to protect the C25-2-02 catalyst from deactivation, a small layer of a cobalt-molybdenum hydrogenation catalyst should be placed between the oxidation and C25-2-02 catalysts.

(4) As described above, one may subsequently treat the product gas in line 11 for conversion of $H_2S$ to sulfur by the methods described in U.S. Pat. Nos. 3,752,877, 4,283,379, and 4,325,936. These methods involve wet chemistry methods for converting the $H_2S$ to sulfur in the presence of an aqueous liquid catalyst. Such processes, however, prove inefficient when the gas stream to be treated contains $SO_2$ and/or $O_2$. For example, in the process disclosed in U.S. Pat. No. 4,283,379, as little as 40 ppmv of free oxygen or $SO_2$ can increase chemical consumption, decrease the efficiency of sulfur recovery, and increase the rate of thiosulfate build-up to the point where a bleed stream is needed and a waste disposal problem created. Thus, since the present invention ensures that all $SO_2$ and $O_2$ is consumed in vessel 9 without deactivating the catalysts therein, it can be seen that the present invention provides a distinct advantage when $SO_2$ or $O_2$-containing gas streams must be treated for removal of sulfur components and conversion thereof to elemental sulfur by the processes described in the foregoing patents is desired.

(5) Although the drawing depicts the oxidation and reducing catalyst as being in the same reactor vessel, it should be understood that one can deviate from this preferred embodiment and place each catalyst in separate reactor vessels operated in series, i.e., one vessel for the oxidation catalyst, one for the hydrogenation catalyst, and one for the low temperature sour gas shift catalyst (if used). This embodiment provides the advantage of allowing for separate removal and replacement of the individual catalysts, coupled with interstage cooling or heating for optimum operation in each stage. This advantage, however, will have to be balanced against the disadvantage of greater capital cost due to the cost of separate vessels and the cost of the cooling or heating units.

(6) Reactor vessel 9, as described above, operates adiabatically. However, in an alternative but non-preferred embodiment, this vessel may operate isothermally.

(7) Although any low temperature sour gas shift catalyst can be used in the invention when low temperature operation is desired, the preferred catalyst is C25-2-02 and other catalysts containing Group VIB, Group VIII, Group VII, and rare earth metal components. Such catalysts preferably contain the active metals dispersed on particles of porous refractory oxide, such as the refractory oxides mentioned hereinbefore, i.e., alumina, silica, etc. Typically, such catalysts contain the Group VIB metal in a proportion between about 8 and 20 weight percent, the Group VIII metal between about 1 and 7 weight percent, the Group VII metal between about 0.03 and 5 weight percent, and the rare earth metal components in a proportion between about 0.1 and 3 weight percent. Such catalysts are typically employed at about 300° to 600° F. and with a gas stream flowing at a space velocity of 2,000 to 5,000 v/v/hr, as calculated at 60° F.

(8) All of the catalysts described in the present specification usually have a high surface area, generally above about 100 $m^2$/gm, and preferably in the range of 150 to 400 $m^2$/gm.

(9) From time to time in the previous discussion, mention has been made of catalysts of high activity and catalysts of moderate activity. A catalyst is considered herein to have high activity when it promotes the desired reaction or reactions under the conditions specified to equilibrium or essentially to equilibrium. A catalyst is considered to have moderate activity when it can promote the desired reaction or reactions under the conditions specified to a significant degree but not necessarily to equilibrium or essentially equilibrium, i.e., can promote at least a 30-percent equilibrium conversion.

The following examples are provided to illustrate the invention or to otherwise illustrate the discussion set forth hereinbefore in the specification. The Examples are not intended to limit the invention, which is defined in the claims.

EXAMPLE I

A Claus tail gas, after being mixed with the products of combustion in a reducing gas generator, has the composition shown in the following Table I:

TABLE I

| Component | Mole % | Component | Mole % |
|---|---|---|---|
| $H_2$ | 5.2333 | Ar | 0.0085 |
| CO | 2.3524 | $CO_2$ | 5.3700 |
| $CH_4$ | 0.0022 | $CH_3SH$ | 0.0004 |
| $N_2$ | 85.1958 | COS | 0.0664 |
| $O_2$ | 0.0245 | $SO_2$ | 0.3175 |
| $H_2S$ | 1.3680 | $CS_2$ | 0.0610 |

It is noted that the foregoing gas stream is reported on an anhydrous basis (actual water vapor content×30 mole %) and contains 1.8743 mole percent total sulfur components, calculated as moles of monatomic sulfur compounds.

The gas stream is passed at a temperature of 450° F. into an adiabatic reactor vessel containing three layers of particulate catalyst, the first being an oxidation catalyst containing 10 weight percent vanadium components and 10 weight percent bismuth components on a support consisting essentially of silica-alumina containing 75 weight percent silica, the second being a sulfided catalyst containing 3 weight percent cobalt components and 10 weight percent molybdenum components (i.e., a sulfactive cobalt-molybdenum catalyst) on a support consisting essentially of gamma alumina, and the third being C25-2-02 catalyst from United Catalysts, Inc., said catalyst being sulfided and comprising about 3.19 weight percent cobalt components calculated as CoO, 13.3 weight percent of molybdenum components, calculated as $MoO_3$, about 0.71 weight percent lanthanum components, calculated as $La_2O_3$, about 0.13 weight percent cerium components, calculated as $CeO_2$, about 0.25 weight percent neodymium components, calculated as $Nd_2O_3$, and about 1.5 weight percent manganese components, calculated as MnO on a support consisting essentially of alumina. The gas stream is passed through the reactor vessel at a pressure just enough above atmospheric to force the gas through the catalyst beds and then into a downstream processing unit. In the bed of oxidation catalyst, wherein the gas stream is passed at a space velocity of about 4,000 GHSV as calculated at 60° F., the $H_2S$ scavenges the available oxygen and also reacts with $SO_2$, raising the temperature by about 35° to 60° F. In the next bed of catalyst, wherein the space velocity is 4,000 GHSV as calculated at 60° F., essentially all the $SO_2$, sulfur vapor, and $CH_3SH$ and some of the $CS_2$ and COS are converted to hydrogen sulfide. Also in this bed of catalyst, some of the CO is converted to $H_2$ by the sour water gas shift reaction. In the final bed of catalyst, wherein the gas stream enters at a temperature around 485° to 510° F. and passes therethrough at a space velocity of 4,000 GHSV as calculated at 60° F., the remaining COS and $CS_2$ are converted to $H_2S$ by hydrolysis to their equilibrium values while the remaining CO is converted in a high proportion (i.e., to equilibrium or nearly so) to hydrogen. The outlet temperature from the final bed of catalyst is in the range of about 525° to about 550° F.

EXAMPLE II

This example demonstrates the advantages of using a hydrogenation catalyst and a low temperature sour gas shift catalyst in series.

The first catalyst is a particulate, sulfided catalyst consisting essentially of about 3 weight percent cobalt components (as CoO) and 8 weight percent molybdenum components (as $MoO_3$) on a gamma alumina support. The second catalyst is particulate C25-2-02 as described in the preceding example. The catalysts are loaded into separate reactor vessels to a volume of 6 cc., and the feed gas identified in Table II is passed serially through the catalyst beds. The feed gas is a composite of steam fed at 137.2 cc./min (as calculated at 60° F.) and the anhydrous feed composition set forth in Table II fed at 262.8 cc/min (as calculated at 60° F.). The composite feed gas is fed through each reactor at a space velocity of 4,000 v/v/hr (as calculated at 60° F.). The temperature in each reactor is isothermally held at 500° F., and the pressure is just enough above atmospheric to ensure gas flow through both reactors and associated piping.

A summary of the analyses of gas samples recovered from the first and second reactor vessels is set forth in the following Table II.

TABLE II

| Component | Feed | Product From First Reactor Containing Co—Mo Hydrogenation Catalyst | Product From Second Reactor Containing C25-2-02 Hydrolysis Catalyst |
|---|---|---|---|
| $H_2$, mole % | 2.63 | 2.7 | 2.94 |
| CO, mole % | 1.62 | 0.23 | 0 |
| $CH_4$, mole % | 0 | 0.01 | 0.01 |
| $N_2$, mole % | 89.74 | 89.54 | 90.02 |
| $O_2$, mole % | 0 | 0 | 0 |
| $H_2S$, mole % | 0.88 | 1.52 | 1.26 |
| Ar, ppmv | 359 | 354 | 355 |
| $CO_2$, mole % | 4.61 | 5.96 | 5.73 |
| COS, ppmv | 482 | 101 | <5 |
| $SO_2$, ppmv | 3717 | 6 | 14 |

Note: Analysis on anhydrous basis; water content about 34 mole percent. Carbon disulfide known to be present in feed in a concentration of about 0.1 mole percent but not analyzed for in any of the above analyses.

The foregoing results clearly indicate that, while the first catalyst (i.e., the hydrogenation catalyst) is highly active for hydrogenating $SO_2$ at 500° F., and while it can also promote the hydrolysis of CO to $H_2$ and COS to $H_2S$ to some degree, the catalyst is not active enough at 500° F. to drive these reactions essentially to completion. On the other hand, the C25-2-02 catalyst is active for driving these reactions essentially to completion. (To be accurate, it should be noted that the hydrolyses of CO and COS are equilibrium limited reactions, but the equilibrium is such that one can obtain essentially full hydrolysis of the CO and COS.)

EXAMPLE III

The experiment of Example II is repeated, except that the feed is somewhat different and the catalysts are reversed, i.e., the C25-2-02 catalyst is now the first catalyst and the Co-Mo hydrogenation catalyst is now the second. A summary of the analyses of the feed and products from the two reactors is set forth in the following Table III:

TABLE III

| Component | Feed | Product From First Reactor Containing C25-2-02 Hydrolysis Catalyst | Product From Second Reactor Containing Co—Mo Hydrogenation Catalyst |
|---|---|---|---|
| $H_2$, mole % | 1.16 | 1.05 | 1.16 |
| CO, mole % | 2 | 0.67 | 0.12 |
| $CH_4$, mole % | 0 | 0 | 0 |
| $N_2$, mole % | 90.98 | 91.82 | 91.2 |
| $O_2$, mole % | 0 | 0 | 0.04 |
| $H_2S$, mole % | 0.87 | 0.99 | 1.56 |
| Ar, ppmv | 17 | <5 | 16 |
| $CO_2$, mole % | 4.43 | 5.27 | 5.89 |
| COS, ppmv | 564 | 1510 | 159 |
| $SO_2$, ppmv | 4186 | 13 | 11 |

Note: Analysis on anhydrous basis; water content about 34 mole percent. Carbon disulfide known to be present in feed in a concentration of about 0.1 mole percent but not analyzed for in any of the above analyses.

The data in Table III clearly indicate the poor performance of the C25-2-02 catalyst at 500° F. when $SO_2$ is present. The catalyst not only becomes inefficient for converting CO to $H_2$ by the water gas shift reaction, but it promotes the undesired reaction:

$$3CO + SO_2 \rightarrow 2CO_2 + COS \qquad (XI)$$

As in the previous example, the data in Table III indicate that the Co-Mo hydrogenation catalyst has activity for the water gas shift reaction and the hydrolysis of COS, but not enough to drive these reactions essentially to completion.

Although the invention has been described in conjunction with a preferred embodiment and illustrative examples, it is apparent that the invention is capable of many modifications, alternatives, and variations. For example, Claus catalysts used to promote the reaction between sulfur dioxide and hydrogen sulfide according to Reaction (III) generally comprise or consist essentially of bauxite or alumina. Such catalysts, when oxygen is present along with the sulfur dioxide, deactivate by sulfation, i.e., the formation of aluminum sulfate. Thus, although oxygen itself is not a deactivant, it does react with sulfur dioxide and the surface of the catalyst to cause deactivation. Such a deactivation mechanism can be prevented in the method of the invention by providing a vanadia, vanadium-bismuth, or other oxidation catalyst upstream of the Claus catalyst bed wherein the entry of oxygen is suspected. Indeed, the oxidation catalyst could simply be an upper layer of oxidation catalyst above the Claus catalyst, and under the oxidizing conditions maintained in the Claus process, the oxygen would be scavenged by reaction with the available hydrogen sulfide, producing either sulfur (the desired product in the Claus process) or sulfur dioxide (a reactant in the Claus reaction). Accordingly, it is intended to embrace within the invention all such modifications, alternatives, and variations as fall within the spirit and scope of the appended claims.

I claim:

1. A process for preventing oxygen from deactivating a catalyst susceptible to deactivation by oxygen comprising (1) scavenging oxygen contained in a feed gas stream comprising carbon monoxide and water vapor as reactant gases in the presence of an oxidation catalyst under conditions which remove essentially all of said oxygen by reaction with hydrogen sulfide and (2) contacting the resultant gas stream, containing said reactants but essentially free of oxygen, with a catalyst susceptible to deactivation by oxygen but active for the water gas shift reaction, said contacting in step (2) being under conditions resulting in the conversion of at least some of said carbon monoxide and water vapor to hydrogen and carbon dioxide.

2. A process as defined in claim 1 wherein said oxidation catalyst comprises one or more vanadium components as a catalytically active promoter.

3. A process as defined in claim 1 wherein said oxidation catalyst comprises one or more vanadium components and one or more bismuth components as catalytically active promoters.

4. A process as defined in claim 1 wherein said catalyst susceptible to deactivation by oxygen comprises one or more Group VIB metal components and one or more Group VIII metal components as catalytically active promoters.

5. A process as defined in claim 1 wherein said catalyst susceptible to deactivation by oxygen comprises one or more Group VIB metal components and one or more iron group components as catalytically active promoters.

6. A process defined in claim 2 wherein said catalyst susceptible to deactivation by oxygen contains one or more cobalt or nickel components and one or more molybdenum or tungsten components as catalytically active promoters.

7. A process as defined in claim 3 wherein said catalyst susceptible to deactivation by oxygen contains one or more cobalt components and one or more molybdenum components as catalytically active components.

8. A process as defined in claim 5 wherein the gases recovered from step (1) and contacted in step (2) contain sulfur dioxide and said catalyst susceptible to deactivation by oxygen is a sulfactive catalyst with catalytic activity for hydrogenating sulfur dioxide to hydrogen sulfide, and the conditions in step (2) are such that essentially all of said sulfur dioxide is converted to hydrogen sulfide.

9. A process as defined in claim 8 wherein product gases recovered from step (2) are contacted with a catalyst deactivatable by sulfur dioxide, with said contacting being such that one or more of the components in said product gases are converted to different components.

10. A process as defined in claim 8 wherein product gases recovered from step (2) are contacted with a catalyst deactivatable by sulfur vapor, with said contacting being such that one or more of the components in said product gases are converted to different components.

11. A process as defined in claim 8 wherein the temperature in step (2) is below about 600° F. and the gases recovered from steps (1) and (2) contain carbonyl sulfide and are contacted with a hydrolysis catalyst active for converting said carbonyl sulfide to hydrogen sulfide at a temperature below 600° F., and the conditions of contacting with said hydrolysis catalyst are such that essentially all of said carbonyl sulfide is converted to hydrogen sulfide at a temperature below about 600° F.

12. A process as defined in claim 11 wherein the hydrolysis catalyst is sulfactive and comprises one or more cobalt components, one or more molybdenum components, one or more manganese components, and one or more rare earth metal components, said contacting with said hydrolysis catalyst being at temperatures below 600° F. and resulting in a high conversion of water vapor and carbon monoxide in said product gases to hydrogen and carbon dioxide.

13. A process defined in claim 12 wherein the temperature during contacting with all of said catalysts is below 550° F.

14. A process as defined in claim 12 wherein the temperature during contacting with all of said catalysts is below 530° F.

15. A process as defined in claim 12 wherein the temperature during contacting with all of said catalysts is below 500° F.

16. A process as defined in claim 12 wherein the temperature during contacting with all of said catalysts is below 450° F.

17. A process as defined in claim 12 wherein the temperature during contacting with all of said catalysts is below 400° F.

18. A process for hydrolyzing carbonyl sulfide comprising contacting carbonyl sulfide and water vapor with a catalyst comprising one or more Group VIII metal components, one or more Group VII metal components, one or more Group VIB metal components, and one or more rare earth components under conditions which react the carbonyl sulfide with said water vapor at an elevated temperature less than 600° F.

19. A process as defined in claim 18 wherein said catalyst comprises cobalt, manganese, molybdenum, and rare earth components.

20. A process as defined in claim 18 wherein said catalyst comprises a porous refractory oxide support and said Group VIII metal components are present in a proportion between about 2.7 and 3.7 weight percent, the Group VII metal component, between 0.5 and 3.0 weight percent, the Group VIB metal component between about 11 and 13 weight percent and the rare earth metal components between about 0.9 and 1.3 weight percent.

21. A process as defined in claim 20 wherein said contacting is in the absence of $SO_2$.

22. A process for treating a feed gas stream containing one or more sulfur components selected from the group consisting of sulfur dioxide, gaseous mercaptans, carbonyl sulfide, and carbon disulfide and further containing one or more reactants selected from the group consisting of hydrogen, carbon monoxide, and water vapor and further comprising oxygen comprising:
   (1) contacting said feed gas stream with an oxidation catalyst in the presence of sufficient hydrogen sulfide under conditions so as to scavenge essentially all of said oxygen by reaction with said hydrogen sulfide; and
   (2) contacting the resulting product gases with a catalyst having activity for hydrogenation or hydrolysis under conditions converting a substantial proportion of at least one of said sulfur components to hydrogen sulfide, said catalyst being deactivatable by oxygen.

23. A process as defined in claim 22 wherein any of said sulfur components present in said product gases are converted in step (2) to hydrogen sulfide essentially to completion.

24. A process as defined in claim 22 wherein the catalyst in step (2) has high activity for hydrogenating $SO_2$ below 600° F. and the process further comprises a step (3) wherein the product gases recovered from step (2) are contacted with a catalyst having high activity below 600° F. for hydrolyzing COS to hydrogen sulfide under conditions wherein essentially all of said COS in said product gases recovered from step (2) is converted to hydrogen sulfide, said catalyst in step (3) being deactivatable by $SO_2$.

25. A process as defined in claim 11 wherein said hydrolysis catalyst is a low temperature sour gas shift catalyst.

26. A process as defined in claim 25 wherein the hydrolysis catalyst comprises a Group VIB metal component, an iron group metal component, a Group VII metal component and one or more rare earth metal components.

27. A process as defined in claim 25 wherein said contacting with the hydrolysis catalyst is at a temperature below about 500° F.

28. A process as defined in claim 18 wherein said contacting is in the absence of $SO_2$.

29. A process as defined in claim 19 wherein said contacting is in the absence of $SO_2$.

30. A process as defined in claim 18 wherein said carbonyl sulfide was originally present in a gas further containing $SO_2$ but said $SO_2$ was removed, prior to contact with said catalyst, by a catalytically promoted reaction.

31. A process as defined in claim 19 wherein said carbonyl sulfide was originally present in a gas further containing $SO_2$, but said $SO_2$ was removed, prior to contact with said catalyst, by reaction with hydrogen in the presence of a hydrogenation catalyst.

32. A process as defined in claim 18 wherein said catalyst is highly active below 600° F. for hydrolyzing carbonyl sulfide, and said contacting is at a temperature less than about 500° F., and said carbonyl sulfide is essentially completely converted to hydrogen sulfide.

33. A process as defined in claim 29 wherein said catalyst is highly active below 600° F. for hydrolyzing carbonyl sulfide, and said contacting is at a temperature less than about 400° F., and said carbonyl sulfide is essentially completely converted to hydrogen sulfide.

34. A process as defined in claim 22 wherein said catalyst in step (2) comprises a Group VIB metal component and a Group VIII metal component as catalytically active promoters.

35. A process as defined in claim 24 wherein said catalyst in step (2) comprises a Group VIB metal component and an iron group metal component as catalytically active promoters and said catalyst in step (3) is a low temperature sour gas shift catalyst.

36. A process as defined in claim 34 wherein said oxidation catalyst comprises a vanadium component as a catalytically active promoter.

37. A process as defined in claim 36 wherein the catalyst in step (2) is susceptible to deactivation by oxygen.

38. A process as defined in claim 37 wherein the oxidation catalyst further comprises a bismuth component as a catalytically active promoter.

39. A process as defined in claim 38 wherein the temperature in steps (1) and (2) is below about 500° F.

40. A process as defined in claim 37 wherein the temperature in steps (1) and (2) is below 400° F.

41. A process as defined in claim 34 wherein said feed gas stream contains carbon monoxide and water vapor and said catalyst in step (2) is active for the water gas shift reaction and said contacting in step (2) results in the conversion of at least some of said carbon monoxide and water vapor to hydrogen and carbon dioxide.

42. A process as defined in claim 37 wherein said feed gas stream contains carbon monoxide and water vapor and said catalyst in step (2) is active for the water gas shift reaction and said contacting in step (2) results in the conversion of at least some of said carbon monoxide and water vapor to hydrogen and carbon dioxide.

43. A process as defined in claim 39 wherein said feed gas stream contains carbon monoxide and water vapor and said catalyst in step (2) is active for the water gas shift reaction and said contacting in step (2) results in the conversion of at least some of said carbon monoxide and water vapor to hydrogen and carbon dioxide.

44. A process as defined in claim 35 wherein the temperature in steps (1), (2), and (3) are all below 500° F.

45. A process as defined in claim 35 wherein said oxidation catalyst comprises a vanadium component as a catalytically active component.

46. A process as defined in claim 45 wherein said oxidation catalyst further comprises a bismuth component as a catalytically active component.

47. A process as defined in claim 35 wherein the catalyst in step (3) is sulfactive and comprises one or more Group VII metal components as catalytically active promoters.

48. A process as defined in claim 35 wherein the temperature in steps (1) and (2) is below 400° F.

49. A process as defined in claim 47 wherein said catalyst in step (3) is deactivatable by oxygen, said catalyst in step (3) further comprises an iron group metal component, a Group VIB metal component, and a rare earth component as catalytically active promoters, the temperature in steps (1), (2), and (3) is below 600° F., said oxidation catalyst comprises a vanadium component as a catalytically active promoter, and said feed gas stream contains carbon monoxide and water vapor and said catalysts in steps (2) and (3) are active for the water gas shift reaction and said contacting in step (2) results in the conversion of at least some of said carbon monoxide and water vapor to hydrogen and carbon dioxide and said contacting in step (3) results in a further conversion of said carbon monoxide and water vapor to hydrogen and carbon dioxide.

50. A process as defined in claim 1 wherein said oxidation catalyst consists essentially of one or more vanadium components as catalytically active promoters on a porous refractory oxide support.

51. A process as defined in claim 16 wherein said oxidation catalyst consists essentially of one or more vanadium components as catalytically active promoters on a porous refractory oxide support.

52. A process as defined in claim 22 wherein said oxidation catalyst consists essentially of one or more vanadium components as catalytically active promoters on a porous refractory oxide support.

53. A process as defined in claim 24 wherein said oxidation catalyst consists essentially of one or more vanadium components as catalytically active promoters on a porous refractory oxide support.

54. A process as defined in claim 1 wherein said oxidation catalyst consists essentially of vanadium and bismuth components as catalytically active promoters on a porous refractory oxide.

55. A process as defined in claim 12 wherein said oxidation catalyst consists essentially of vanadium and bismuth components as catalytically active promoters on a porous refractory oxide.

56. A process as defined in claim 15 wherein said oxidation catalyst consists essentially of vanadium and bismuth components as catalytically active promoters on a porous refractory oxide.

57. A process as defined in claim 34 wherein said oxidation catalyst consists essentially of vanadium and bismuth components as catalytically active promoters on a porous refractory oxide.

58. A process as defined in claim 40 wherein said oxidation catalyst consists essentially of vanadium and bismuth components as catalytically active promoters on a porous refractory oxide.

59. A process as defined in claim 35 wherein said oxidation catalyst consists essentially of vanadium and bismuth components as catalytically active promoters on a porous refractory oxide.

60. A process as defined in claim 48 wherein said oxidation catalyst consists essentially of vanadium and bismuth components as catalytically active promoters on a porous refractory oxide.

61. A process as defined in claim 49 wherein said oxidation catalyst consists essentially of vanadium and bismuth components as catalytically active promoters on a porous refractory oxide.

62. A process as defined in claim 1 wherein the contacting with both of said catalysts is under net reducing conditions.

63. A process as defined in claim 8 wherein the contacting with both of said catalysts is under net reducing conditions.

64. A process as defined in claim 9 wherein the contacting with all of said catalysts is under net reducing conditions.

65. A process as defined in claim 11 wherein the contacting with all of said catalysts is under net reducing conditions.

66. A process as defined in claim 12 wherein the contacting with all of said catalysts is under net reducing conditions.

67. A process as defined in claim 15 wherein the contacting with all of said catalysts is under net reducing conditions.

68. A process as defined in claim 55 wherein the contacting with all of said catalysts is under net reducing conditions.

69. A process as defined in claim 56 wherein the contacting with all of said catalysts is under net reducing conditions.

70. A process as defined in claim 39 wherein the contacting with both of said catalysts is under net reducing conditions.

71. A process as defined in claim 49 wherein the contacting with all of said catalysts is under net reducing conditions.

72. A process as defined in claim 61 wherein the contacting with all of said catalysts is under net reducing conditions.

73. A process as defined in claim 19 wherein $H_2S$ is also in contact with said catalyst at the start of said contacting.

74. A process as defined in claim 21 wherein $H_2S$ is also in contact with said catalyst at the start of said contacting.

75. A process as defined in claim 33 wherein $H_2S$ is also in contact with said catalyst at the start of said contacting.

76. A process as defined in claim 18 wherein $H_2S$ is also in contact with said catalyst at the start of said contacting and said COS is essentially fully converted to $H_2S$.

77. A process as defined in claim 18 wherein said COS is essentially fully converted to $H_2S$ during said contacting.

* * * * *